(12) United States Patent
Madhvanath

(10) Patent No.: US 7,983,485 B2
(45) Date of Patent: Jul. 19, 2011

(54) SYSTEM AND METHOD FOR IDENTIFYING SYMBOLS FOR PROCESSING IMAGES

(75) Inventor: Sriganesh Madhvanath, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 827 days.

(21) Appl. No.: 12/030,214

(22) Filed: Feb. 13, 2008

(65) Prior Publication Data
US 2008/0267534 A1    Oct. 30, 2008

(30) Foreign Application Priority Data
Apr. 30, 2007    (IN) .............................. 916/CHE/2007

(51) Int. Cl.
*G06K 9/62* (2006.01)
(52) U.S. Cl. ....................................... 382/182; 382/222
(58) Field of Classification Search ........................ None
See application file for complete search history.

(56) References Cited

U.S. PATENT DOCUMENTS

| | | | |
|---|---|---|---|
| 3,709,525 A * | 1/1973 | Frank ............................. | 283/117 |
| 6,351,559 B1 | 2/2002 | Zhou et al. | |
| 7,131,061 B2 * | 10/2006 | MacLean et al. ............. | 715/210 |
| 7,372,993 B2 * | 5/2008 | Lagardere et al. ............ | 382/186 |
| 2005/0114772 A1 * | 5/2005 | Talley et al. ................... | 715/541 |

\* cited by examiner

*Primary Examiner* — Brian Werner

(57) ABSTRACT

An image-processing system receives an image from a user and identifies an image-processing instruction which has been added to the image by the user. The instruction corresponds to an image-processing operation which is to be applied to at least a portion of the image in order to manipulate the image into a modified form. When the system is coupled to a device such as a photocopier, the photocopier is controlled to perform the image manipulation in accordance with the identified instruction and to print the modified image. Thus the image can be modified without the need to alter the original image itself.

22 Claims, 10 Drawing Sheets

| ID | Symbol | Processing operation | Pixel representation |
|---|---|---|---|
| 1 | ↕ | Linear Stretch | |
| 2 | ↰ | Clockwise rotation | |
| 3 | A/A | Colour inversion | |
| 4 | ⊗ | Redaction | |
| ... | ... | ... | ... |

FIGURE 2

SYSTEM AND METHOD FOR IDENTIFYING SYMBOLS FOR PROCESSING IMAGES

RELATED APPLICATIONS

Benefit is claimed under 35 U.S.C. 119(a)-(d) to Foreign application Ser. 916/CHE/2007 entitled "IMAGE-PROCESSING SYSTEM" by Hewlett-Packard Development Company, L.P, filed on 30th Apr., 2007, which is herein incorporated in its entirety by reference for all purposes.

BACKGROUND

Often it is necessary to modify an image in some way before reproducing it for distribution to others. For example, a user may want to correct, emphasise, or strike out some portions of text or images in a document before distributing it, so as to keep information confidential or to rearrange parts of a document for educational purposes.

Conventionally, this can be performed by marking these changes on the original document using a black marker or whitener fluid for example, and generating identical copies using a photocopier. This technique is disadvantageous as the annotations can interfere with the subsequent readability of the original, particularly where the annotations are made in permanent ink and take the form of strikethrough of text. In addition, the annotations may not be transferred effectively to the photocopy, and annotations may not be interpreted uniformly if they are complex and written in an author's unique writing style.

Techniques which avoid annotating an image can be cumbersome to perform. Examples are folding a document or covering of unwanted sections of a document with a white sheet of paper, prior to copying.

It is also possible to use software on a separate computer to manipulate a scanned image manually. This can be time-consuming and complicated, and the additional hardware and software requirements are seldom justified.

There is therefore a need for a system which enables an image to be modified in a way which is not associated with the above problems.

BRIEF DESCRIPTION OF THE DRAWINGS

Embodiments of the present invention will now be described, by way of example only, with reference to the accompanying drawings, in which:

FIG. 2 shows an example of the contents of the instruction database in the image-processing system according to an embodiment of the present invention;

DETAILED DESCRIPTION

Figure 1:
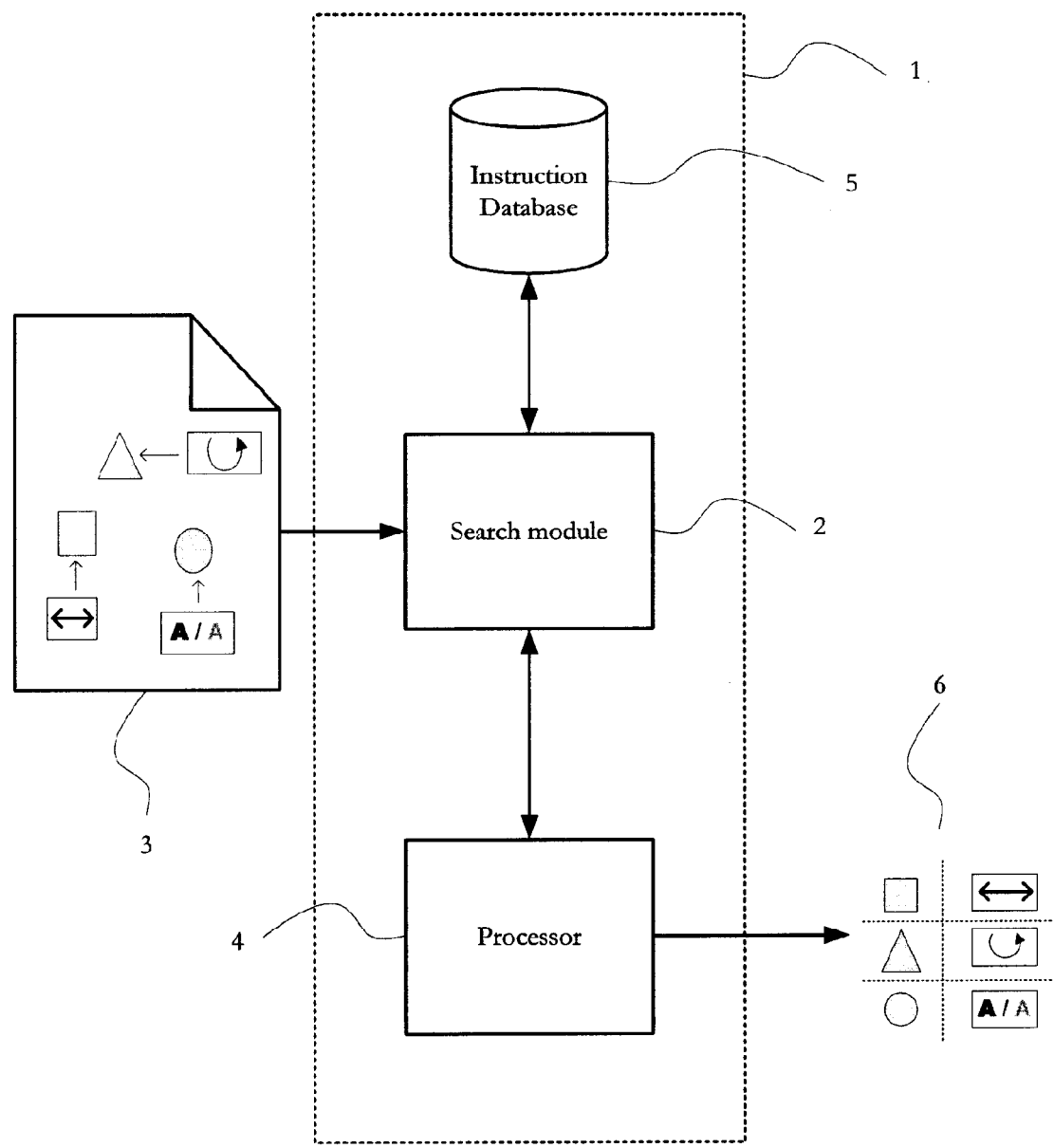
FIG. 1 shows the components of an image-processing system according to an embodiment of the present invention.

The components of an image-processing system 1 according to an embodiment of the present invention are shown in FIG. 1. The components are, for example, functional modules of a computer program implemented in a microcontroller. The microcontroller can be installed in an image reproduction device such as a photocopier, as described below with reference to FIG. 9.

The image-processing system 1 comprises a search module 2 which identifies any processing instructions which have been included in an image 3 provided by the user, together with the areas of the image to which the processing instructions are to be applied. The operation of the search module 2 is controlled by a controller/processor 4.

A processing instruction is a command to perform a particular image processing operation or transformation, for example rotation of a particular section of an image, and takes the form of one of a predetermined set of symbols which correspond to each possible processing operation. A set of processing instructions is predetermined to ensure consistency among all users.

The processing instructions may be capable of referring to a uniquely identifiable portion of an image, such as a line or figure, and of unambiguously identifying the operation which must be applied to that portion. A "region of interest", such as a paragraph of text, or a graphic, can be identified using a surrounding frame, for example, either already included as part of the image itself, or explicitly annotated by a user, and the processing instruction is then associated with the region of interest via a linking arrow, for example. Alternatively, in the absence of such a frame or linking arrow, the processing instruction can be associated with the region of interest by identifying an isolated line of text or a figure adjacent to a marking in the margin of a document, for example. Examples will be described in more detail with reference to FIGS. 3a, 3b, 7a, 7b, and 7c.

In the embodiment shown in FIG. 1, the image 3 is a document containing graphics. In the example shown, square, triangular and circular graphics are shown, adjacent to which three respective processing instructions—linear stretching, rotation, and colour inversion—have been marked up respectively.

The set of possible processing instructions and their respective symbols is stored in an instruction database 5, and the search module 2 identifies a processing instruction in the image 3 by applying an algorithm which searches the image for information which is held in the database 5.

The symbol set is designed by a user via a computer with a graphics design package, and stored on a storage medium such as a CD-ROM. The symbol set is then transferred to the database 5 from the CD-ROM.

FIG. 2 shows an example of a symbol set which is used in an embodiment of the present invention, in the form in which it is stored in the database 5. The database 5 is arranged in tabular form and contains a mapping between a set of symbols 22, and their associated processing operations 23. Typically there are of the order of 30 different symbols, although a set containing more or fewer symbols could be used. Each symbol 22 is assigned a unique identification number 21, which is listed in the database 5, for indexing purposes. The assignment is performed at the symbol set design stage, and accordingly, the order in which the symbols are listed can be controlled. In addition to the examples shown in FIG. 2, other image processing operations are of course possible, such as scaling to fit a page, shear transformations, text emphasis, noise cleanup, and handwritten annotation cleanup, for example. Symbols may take the form of small graphics as shown in FIG. 2, but image-processing operations may also represented by, for example, lines or text in the margin of an image, circling of text or figures, coloured symbols representing re-colouring or highlighting options, a series of user-defined alphanumeric codes or the like.

Once the search module 2 has identified any processing instructions, their associated operations and regions of the image to which they are to be applied, a set of data 6 is prepared by the processor 4 containing information relating to the identified processing operations, extracted from the instruction database 5, and information relating to the identified regions, such as pixel co-ordinates. The output data has a form which can be interpreted by an image manipulator in an image reproduction device. It may take the form of a table, for example, containing a mapping between image pixels or co-ordinates relating to regions of interest and the processing operation to be performed on those pixels, or at those co-ordinates. The processing is performed by a device in which the image-processing is installed, such as a photocopier, described more fully with respect to FIG. 8.

Figure 3B:
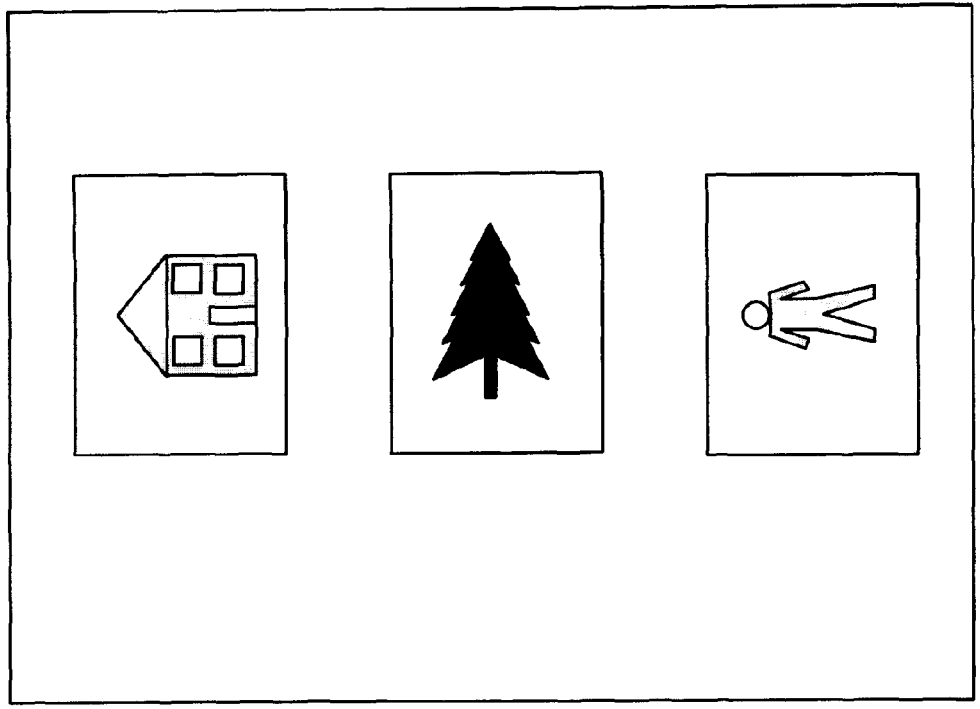
FIGS. 3a and 3b show a first example of an image transformation performed by an image-processing system according to an embodiment of the present invention.
Figure 3A:
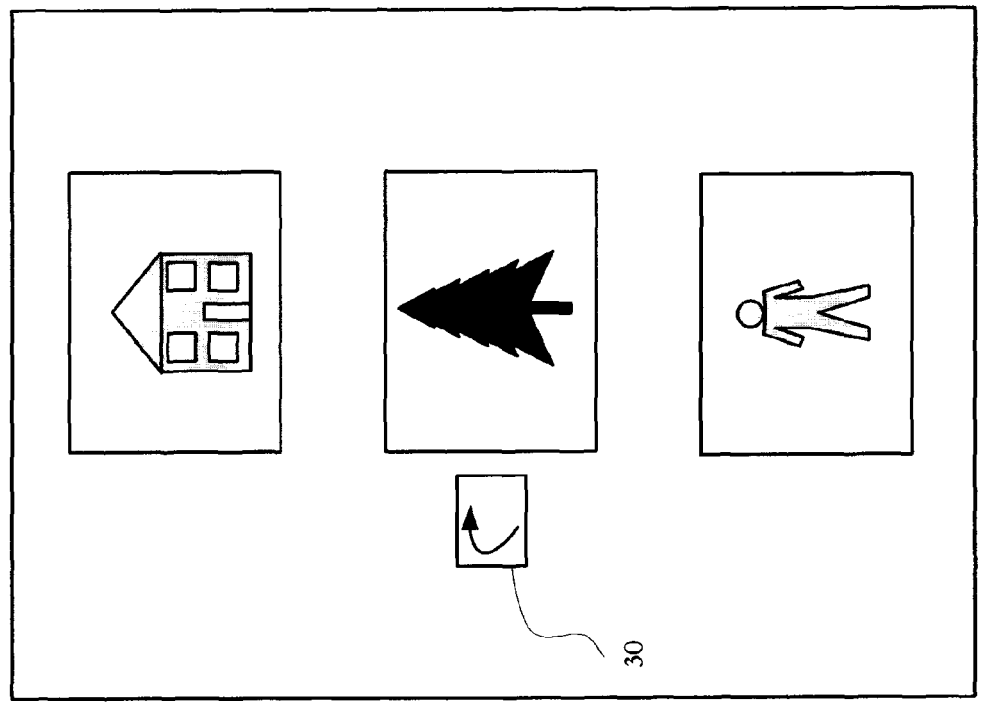

FIG. 3a shows an example of an image-containing document, to which a processing instruction 30 has been added by a user. Each image is contained within a frame. The processing instruction 30 has the form of a rotation symbol adjacent to the frame and indicates that the second image should be rotated clockwise by 90°. FIG. 3b shows effect of this processing instruction in a reproduced document, in which the first and third images are unchanged, but the second document has been rotated clockwise by 90°. The original document remains usable for other purposes as no change is made to the orientation of the second image on the document itself.

Figure 4:
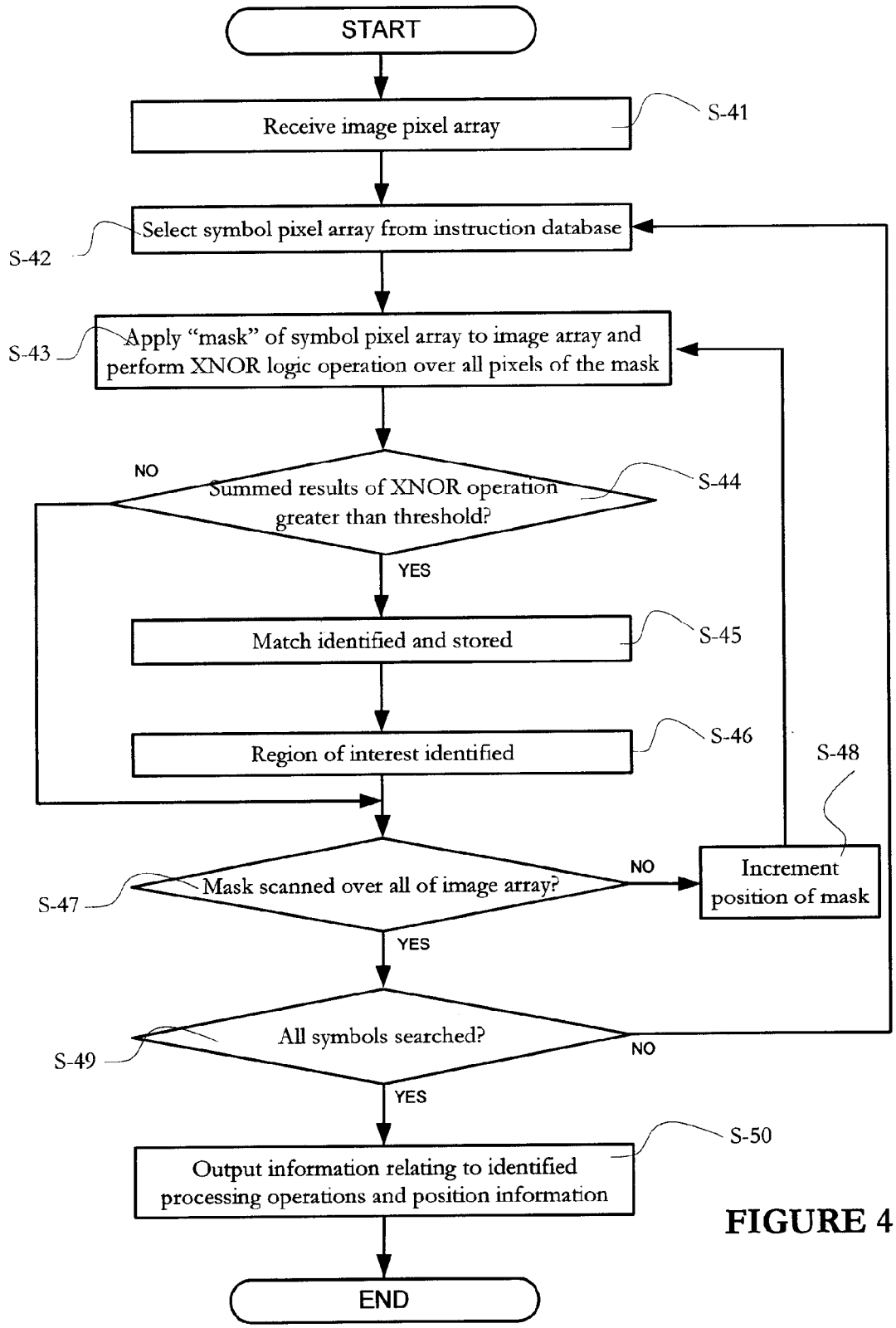
FIG. 4 is a flow chart showing the operation of the search algorithm used by the search module of the image-processing system according to an embodiment of the present invention.

FIG. 4 is a flow chart showing the operation of the search module 2 according to an embodiment of the present invention. For simplicity, the search algorithm as it applies to a black and white image will be described, but it will be appreciated that the principle described can be extended to colour image processing.

In step S-41, the search module 2 receives an input image in the form of a two-dimensional pixel array.

As a two-dimensional pixel array is expected, each symbol 22 is also stored in the database as a two-dimensional pixel array 24, for use by the search module 2. Each pixel array 24 is generated automatically at the design stage, to a resolution which corresponds with the expected resolution of a received image. In step S-42, the search module 2 selects a two-dimensional pixel array from the instruction database 5, corresponding to a particular image-processing operation. In this embodiment, the selection is based on the order in which the processing operations are listed in the database 5, based on the associated ID number 21.

In order to identify a symbol in the image in step S-43, the search module 2 uses an algorithm in which a "mask" of pixels, corresponding to a two-dimensional symbol array, is passed over the image array, and an exclusive NOR (XNOR) logic operation is performed on corresponding mask and image array pixels. The result of the XNOR operation is a mask-sized array of bits, each of which is high in a position where the mask pixel matched its corresponding image pixel, and low otherwise. By summing the bits in the array, an estimate can be made in step S-44 of the degree to which the underlying image array matches the mask, and hence the likelihood of the symbol, to which the mask corresponds, being present in the image. A threshold can be set with which the sum can be compared, so as to control the sensitivity of the search. A low threshold may result in all processing instructions being identified, together with the possibility of "false alarms" where image content information is erroneously identified as an instruction. A high threshold may result in some instructions being missed if they do not sufficiently match those shown in the database 5.

If a symbol is identified in the image, the match is stored in a memory (not shown) in step S-45, and the region of the image to which the identified symbol corresponds is determined in step S-46. This may be achieved using a number of techniques. In the present embodiment, regions of interest are marked up by a user with a surrounding frame or box, and the search module 2 searches for one or more frames in the image via a conventional technique, such as a connected component search. If no such frame is found in the image, it is assumed that the processing instructions are positioned sufficiently closely to regions of an image, such as an isolated line of text or a figure, that an identification of the position of the instruction will provide sufficient information for the portion of the image which should be processed to be identified.

It may also be assumed that a frame which is adjacent to the identified symbol is intended to signify the portion of the image to which that symbol corresponds. In an alternative technique, however, a search may be performed for a linking arrow, for example, between the edge of a frame and the identified symbol in order to determine the relationship between the two.

In the present embodiment, the mask is applied over the entire image array in stages by sequentially moving the mask across rows of the two-dimensional image array, and then repeating the process for the next row. A comparison is made in step S-47 between the lower-right co-ordinate of the mask and the lower-right co-ordinate of the image in the case where the mask is applied from left to right and from top to bottom over the image. If both horizontal and vertical co-ordinates of the mask have lower value than those of the corner of the image, it is determined that the mask has not been applied over all parts of the image, and the position of the mask is incremented in step S-48, in this example by one pixel to the right. In the case where the mask is at the rightmost edge of the image, the mask is moved down a pixel and aligned with the leftmost edge. In order to decrease processing time, at the expense of reduced accuracy, the size of the increment with which the mask is shifted can be increased as desired.

Figure 5:
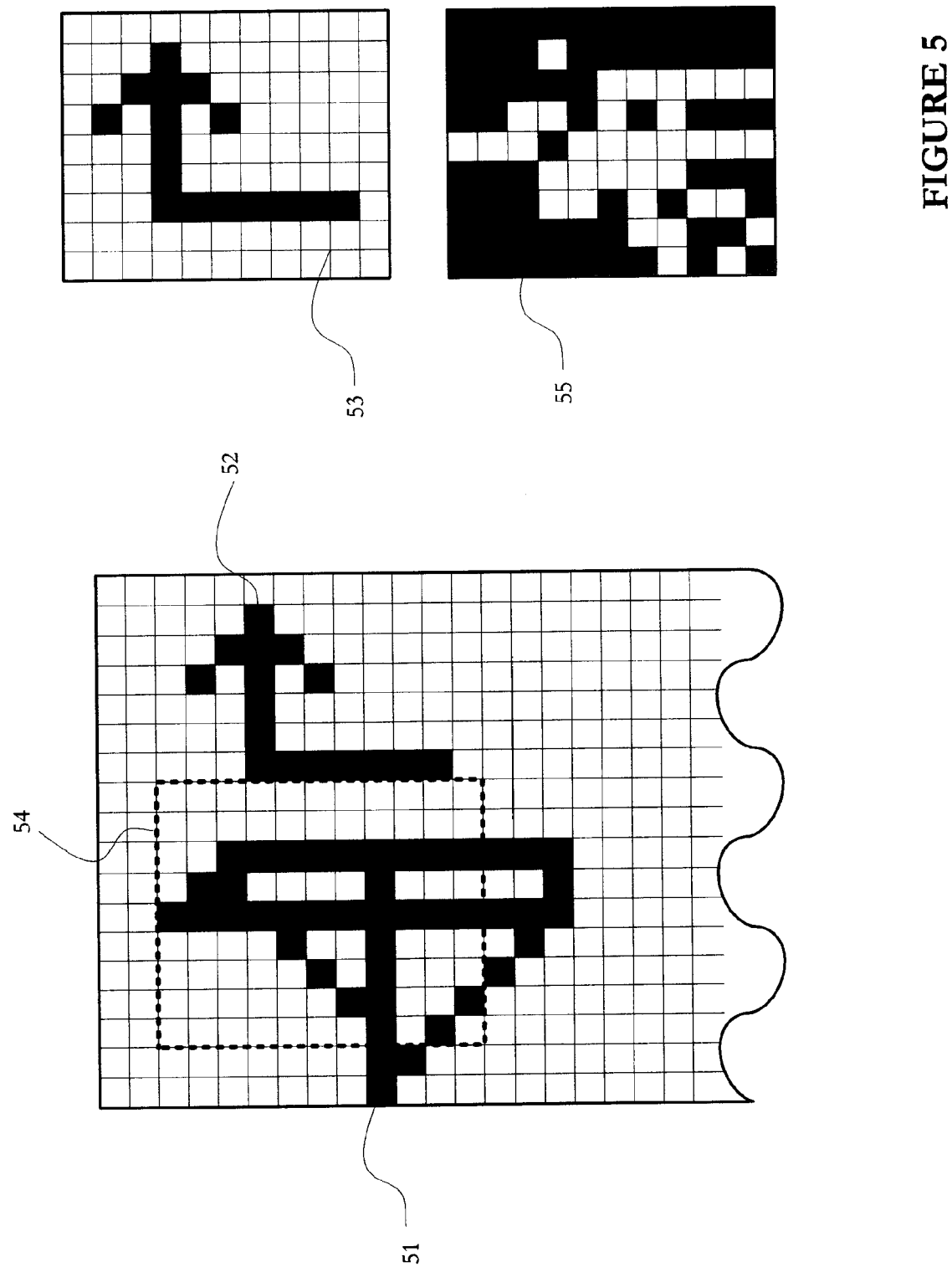
FIG. 5 shows an example of a negative result obtained by the search algorithm operating according to the algorithm of FIG. 4.

FIG. 5 shows a portion of a document containing a diagram of a boat 51 which has been scanned into a two-dimensional pixel array, together with a scanned symbol 52 for a clockwise rotation operation which has been marked up on the document. In the example shown, a rotation symbol mask 53 has been selected from the database 5 and is applied over a portion 54 of the image shown by the dotted lines. FIG. 5 shows the result 55 of an XNOR operation when the mask is applied over a part of the image content, i.e. the boat, rather than the processing instruction 52. High bits are shown as dark. There is a significant proportion of low bits shown in the array 55 as the image content does not correspond to the rotation symbol mask 53.

Figure 6:
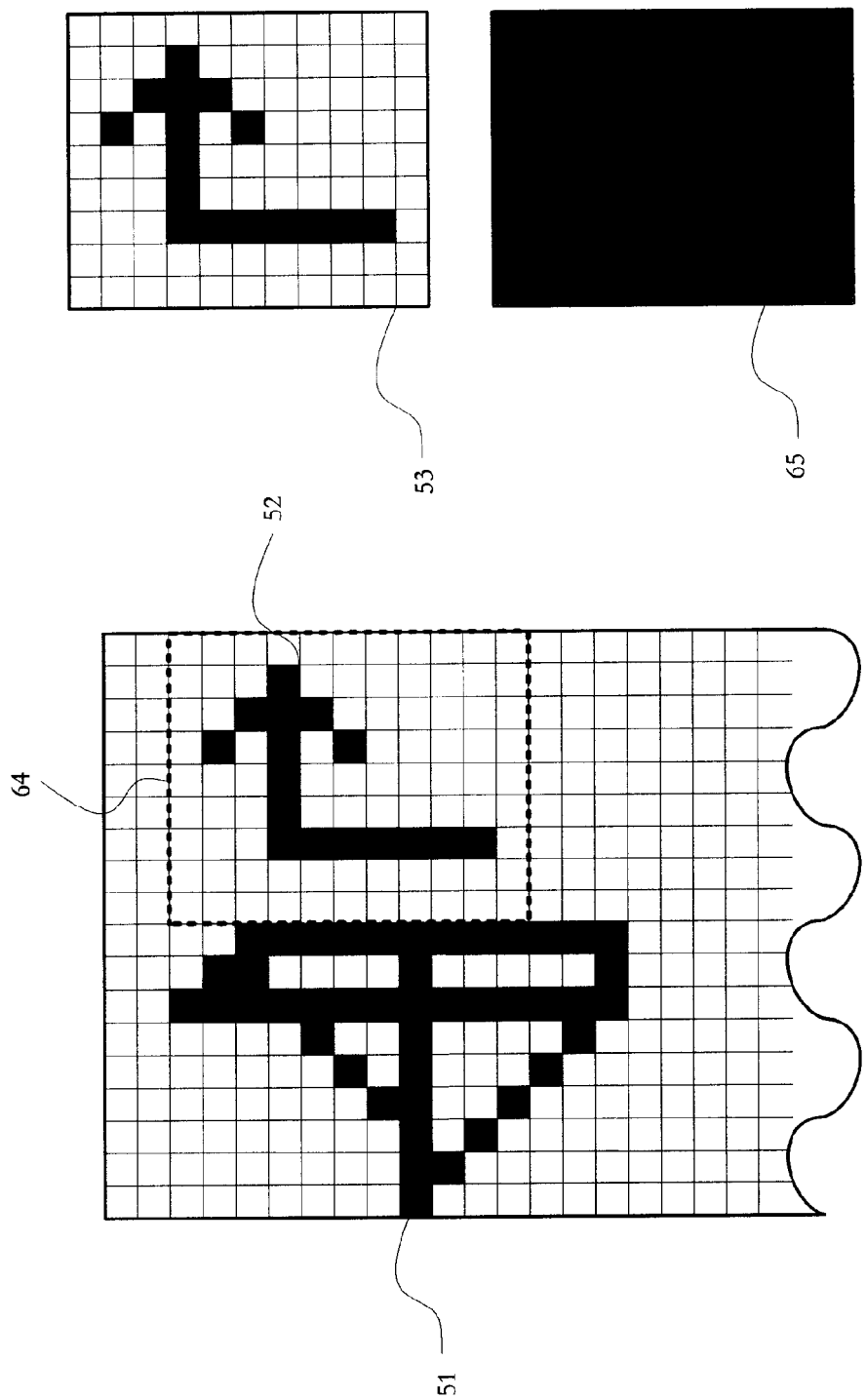
FIG. 6 shows an example of a positive result obtained by the search algorithm operating according to the algorithm of FIG. 4.

FIG. 6 shows the result 65 of the XNOR operation when the mask is applied directly over the processing instruction, the position 64 of the mask shown by the dotted lines. Here all of the bits in the array are high and so a match is indicated.

As handwriting styles differ from user to user, it is unlikely that all users will annotate documents with the same sized processing instructions, and in a modification to the above embodiment, it is possible to account for variation between users by scaling the symbol mask after each search is performed, in order to search for a larger or smaller version of a symbol in the document. The user can set the degree to which the symbol mask is scaled, so that a number of searches can be performed over a small symbol size range at fine intervals where there is only one user of the image-processing system, for example, or where all users have similar handwriting styles. A larger symbol size range, with searches performed at coarser intervals is more appropriate where a larger variation in handwriting styles can be expected.

If no match is found for a symbol in the image, and no matches are found for any scaled versions of the symbol, the symbol mask having been applied to the entire image, the search module notes that the search has been completed for that symbol and selects a new mask for use in the search algorithm, based on a different symbol in the instruction database. The procedure described above is repeated, identifying any matches and associated co-ordinates for the symbols, until all symbols in the database have been searched for. The search algorithm determines in step S-49 whether there are remaining symbols to search for by comparing the ID 21 of the most-recently searched symbol with the highest value-ID stored in the database 5, for example, if the symbols 22 are searched for in order of ID number 21.

When all symbols have been searched for, checked via the analysis in step S-49, the search is complete, and the search result information which has been accumulated is processed into a form which can be output by the processor 4 for subsequent processing in step S-50, as described below with reference to the apparatus shown in FIG. 8.

The information provided by the processor 4 can contain a sequence of processing operations to be applied to the same area of the image, such as cropping followed by scaling, for example, as well as specifying different operations for different regions.

In a modification to the above embodiment, the database 5 is configured to list the processing operations in the order in which they are most commonly identified, so searches for these operations are performed first. A user controls the search algorithm to search only for a predetermined number of processing instructions, in order to increase the efficiency of the algorithm. If a document has been marked up with three processing instructions, for example, the algorithm is controlled to stop searching after three instructions have been identified, to avoid unnecessary wasting of resources. By prioritising the search for commonly-used instructions, the likelihood of a fast search result being obtained is increased. The search results are then fed back to the database so that the order in which the processing instructions are stored can be re-evaluated be re-assigning ID numbers.

In an alternative embodiment, the search algorithm distinguishes processing commands from image content by searching for instructions only in a predetermined margin of an image where no image content information is expected. If the image is marked-up in this way, the processing time can be reduced as the symbol mask needs to be applied only to a portion of the image, rather than the entire image as discussed above.

Figure 7C:
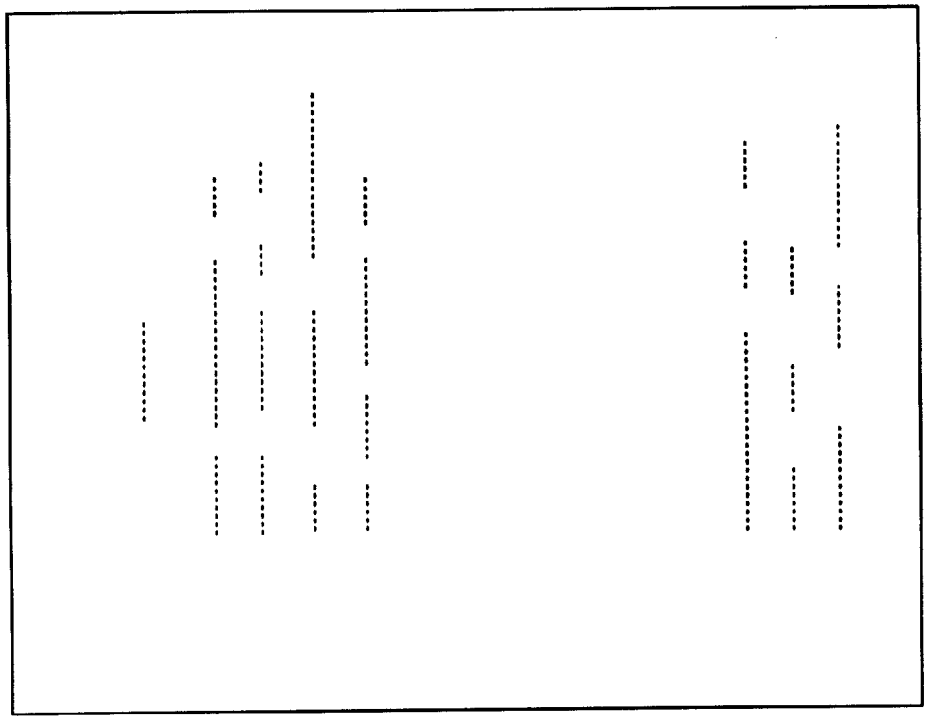
FIGS. 7a, 7b and 7c show a second example of an image transformation performed by an image-processing system according to an embodiment of the present invention.
Figure 7A:
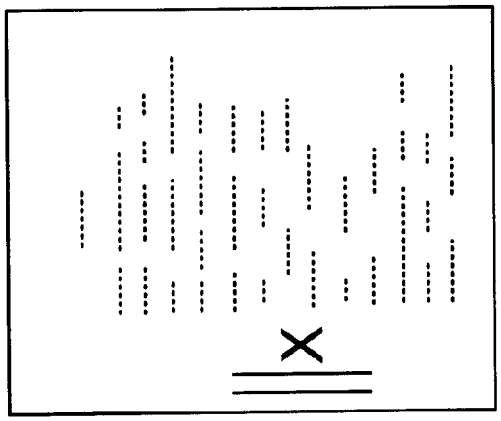
Figure 7B:
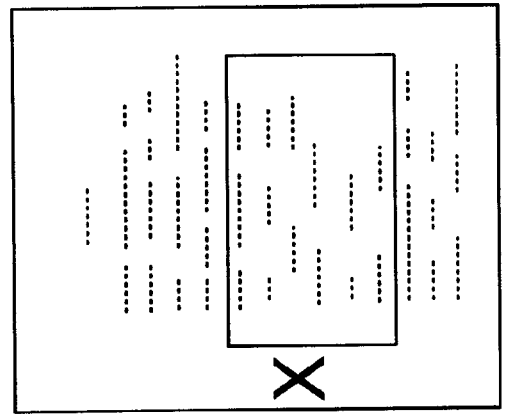

FIGS. 7*a* and 7*b* show examples of a text document, a portion of which is to be deleted as part of a redaction operation. In FIG. 7*a*, the redaction operation is indicated by an "X" in the margin, while a pair of vertical lines in the margin indicate the longitudinal extent of the portion of text to be deleted. In FIG. 7*b*, the portion of text to be deleted is identified using a frame encircling the text, annotated by the user, and the deletion command itself is shown by an "X" symbol in the margin. FIG. 7*c* shows the text document after the deletion operation has been performed, based on either of the documents shown in FIGS. 7*a* and 7*b*. Using either of these markup techniques in FIGS. 7*a* and 7*b*, it is possible to produce a document which contains only a portion of text from the original document without needing to delete the unwanted portions from the original document itself.

Figure 8:
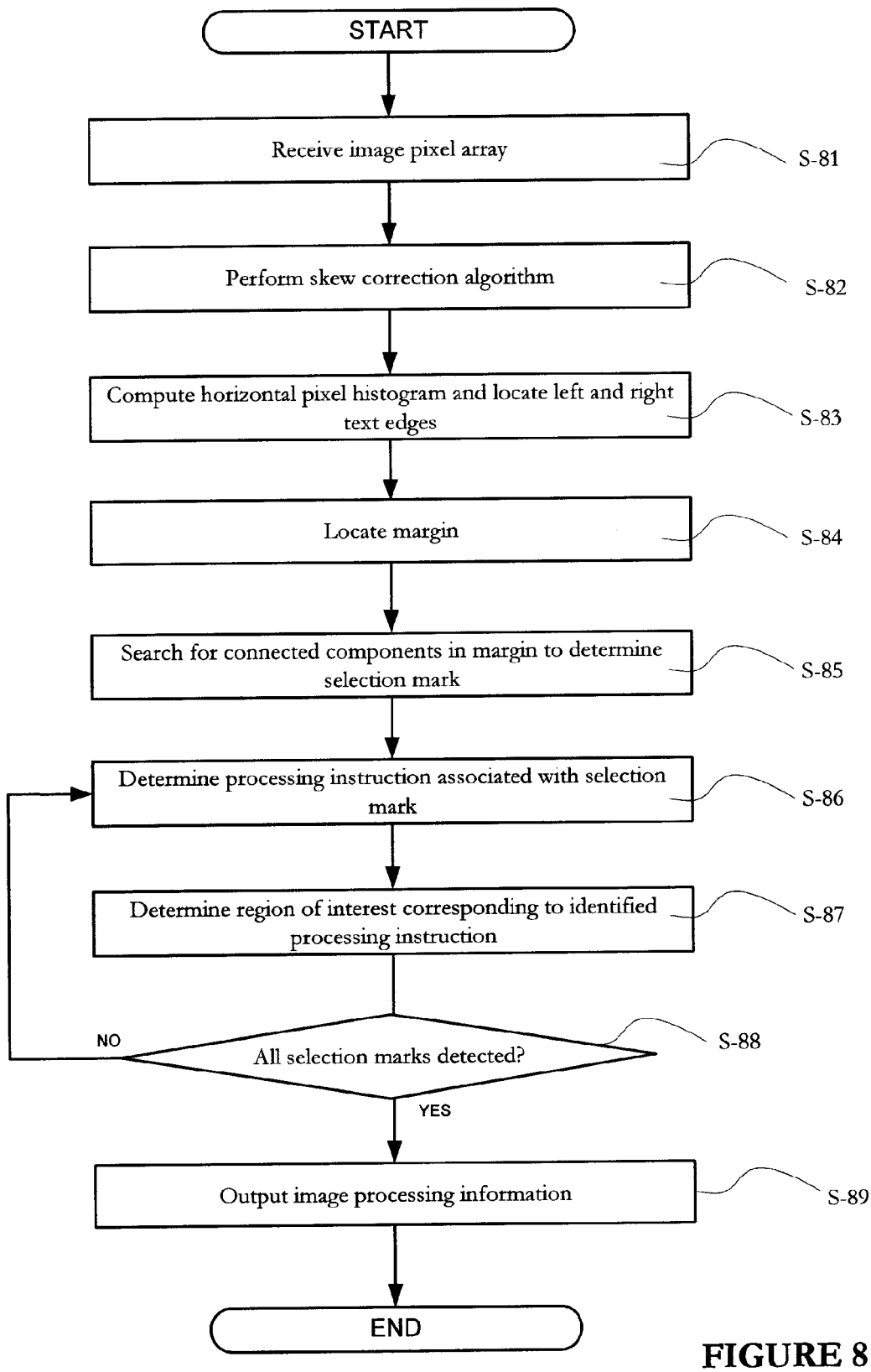
FIG. 8 is a flow chart showing the operation of the search algorithm used by the search module of the image-processing system according to a further embodiment of the present invention.

FIG. 8 is a flow chart showing an algorithm of how the search module 2 operates in this embodiment, for the case where an image is marked up as shown in FIG. 7*a*.

In step S-81, a two-dimensional image pixel array is received, as in step S-41 in the embodiment described above.

In step S-82, an algorithm is applied to determine whether the pixel array is free of skew. It is possible that contents of the entire array will be misaligned with the edges of the array, and if this is the case, the margin of the image array will not correspond to that expected by the search algorithm. It is therefore important that any skew is removed. The skew can be removed using a conventional skew estimation and image rotation algorithm.

In step S-83, a horizontal pixel histogram is generated by counting the black pixels in each column of the image array. The left and right edges of the text region can be identified where there is a sharp increase in the value of the histogram.

In step S-84, the region of the image between the right edge of the text region and the right edge of the entire image is identified as the right margin.

In step S-85, all connected components in the right margin image are identified. A connected component is an image containing a connected (i.e. continuous) arrangement of pixels. Pairs of adjacent components are detected which resemble vertical lines, based on their height and aspect ratio. Each of these corresponds to a "selection mark". A pair of lines is identified by locating two lines which have a spacing of white pixels between them of a predetermined width, the width controlled by the search algorithm. A search for a variety of line spacings can be performed analogously to the symbol scaling technique described above, to account for differences in user's markup styles.

For each selection mark the subimage that lies between it and the edge of the image is determined, and a symbol in the subimage is identified using the identification techniques described above to determine the corresponding processing instruction, in step S-86.

In step S-87, the subimage of the text region between the left edge of the text region and the selection mark is identified as the region of interest.

A check is performed in step S-88 to determine whether all selection marks have been detected. If there are more selection marks, the process returns to S-86.

Once all selection marks have been detected, the information is output by the processor relating to identified processing operation, and the position of the regions of interest in step S-89.

This embodiment is also advantageous where processing instructions are used which refer to the entire image, rather than having particular co-ordinates. A processing instruction such as "noise cleanup", referring to the entire image can be identified by its position in a particular portion of the margin, such as the top-left corner for example.

In an alternative embodiment, a set of symbols representing image-processing instructions is used in which each symbol contains a frame surrounding a particular command graphic. As an example, a linear stretch instruction symbol could be an arrow within a triangular frame. The frame causes the search module 2 to distinguish what is contained within the frame from image content information such as text or graphics which are to be reproduced, and to interpret the frame's contents as a processing instruction. When an image is provided to the search module 2 of the present embodiment, the search module 2 performs a search for a triangular frame, for example in order to identify the location in the image of a processing instruction.

In this embodiment, the search module 2 is configured such that it is capable of accounting for deviations from a perfect triangle in symbol frames drawn by a user. For example, it is possible that a user may draw a triangle where one of the sides is slightly curved rather than being straight. In this case, a tolerance can be factored into the processing algorithm, so that a triangle can be identified if it matches the stored template to within a particular degree. The tolerance is set by a user in order to control the sensitivity of the search algorithm, and is set by controlling the pixel comparison threshold as described above.

Variations in user handwriting styles may be significant, however, and in a further embodiment of the present invention, a symbol recognition module is used by the search module in order to perform an algorithm which is capable of extracting processing instructions having a variety of shapes and sizes The symbol recognition module executes a standard algorithm used for recognizing handprinted characters, such as those found on forms, cheques images, postal mail and so on, and the algorithm takes the place of steps S-42 to S-48 in the embodiment described above. By using a dedicated algorithm for processing handwriting, the flexibility of the image processing system 1 is increased as the restrictions on the exact shape and size of the markup symbols can be relaxed.

In the embodiments described above, the symbol sets are defined in a graphics package, prior to loading into the database 5 of the image-processing system. This is not the only way in which the symbol set can be defined, however. The symbol recognition module described above can be trained using numerous samples of each symbol written by different writers.

It will therefore be appreciated that it is possible to identify a number of different processing instructions using different techniques, in order to generate a set of information containing a processing instruction and an associated image position or portion. Combinations of underlining, circling, strikethrough of text in one or more colours can be recognised either from the middle of a document, or a margin for example. In embodiments of the invention, handwriting can be detected as a specific colour, so that blue ink can be recognised, for example. A plurality of sets of symbols can be stored in the database 5 for selection by the user, according to personal styles. The contents of the database 5 may also be varied at any time by a user by substituting or reprogramming it, for example. Reprogramming can either be performed externally with respect to the image processing system 1, or can be performed in situ by connecting the image-processing system 1 to the internet or another programming signal. Alternatively, a set of symbols could be loaded into a temporary database such as a RAM during operation of the image-processing system 1, with a set of symbols being chosen from a range of different sets stored on a CD-ROM for example.

The selection could be performed via a user interface so that different symbol sets could be used for each user, according to his or her preferences.

The image processing system 1 may be used in a variety of devices having the function of reproducing an input image. Suitable devices have an image receiver, for receiving an image provided by a user in the form of an imaging sensor, such as a scanner or a CCD array, which is able to transform an image into data which can be processed and reproduced by a printer, for example. The processor 4 communicates with a central controller of the image reproduction device such as a photocopier so that it can be synchronized with the operation of the device as a whole. Alternatively, the image-processing system 1 may be arranged so that the central controller is itself the processor which executes the computer program instructions, and in this case, the image-processing system 1 is not a separate microcontroller, but a set of instructions included in the operating program of the image reproduction device.

In both of the examples described above, the computer instructions which are executed by the processor can be loaded into to a memory from an external storage means such as a CD-ROM, or can be downloaded via the internet.

Alternatively, each functional module of the image-processing system 1 is arranged as a discrete hardware component, with data exchanges between the components being controlled by the processor 4. For example, the search module may contain a series of comparators for performing pixel comparisons, and a shift register for enabling movement of the symbol mask relative to the image array.

Figure 9:
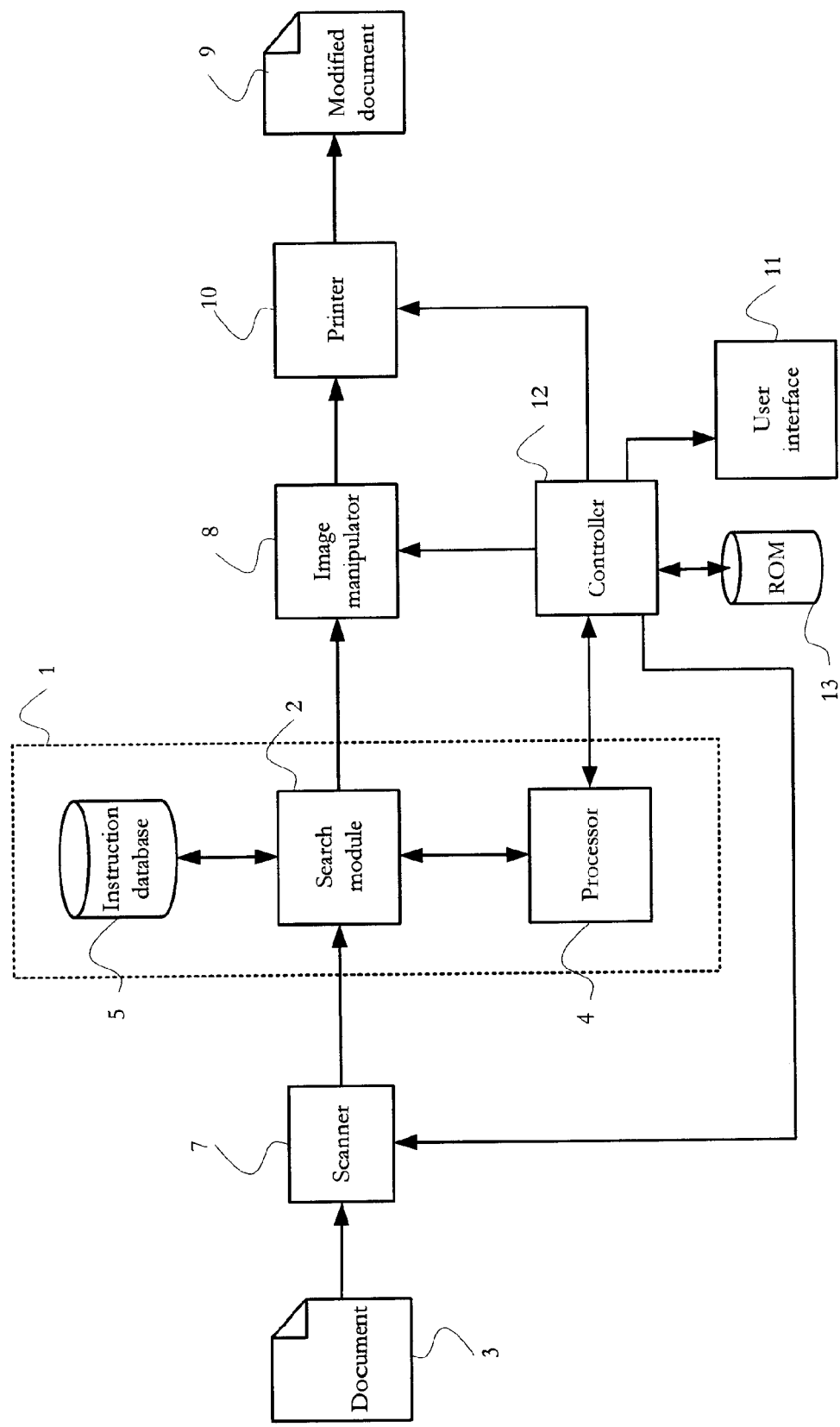
FIG. 9 shows the components of a photocopier according to an embodiment of the present invention, which contains the image-processing system according to an embodiment of the present invention.

FIG. 9 shows the components of a photocopier according to an embodiment of the present invention, which contains the image-processing system 1. In this embodiment, the photocopier comprises a scanner 7 for scanning a document 3 provided by a user. The scanner 7 provides scanned image data in a two-dimensional image array, suitable for analysis by the search module 2. The search module 2 determines any processing instructions and their associated operations which were included on the original document 3 by analysing the scanned image data using the search algorithm described above, and the processor 4 presents the information relating to the identified operations and their locations in the image to an image manipulator 8 which performs the necessary image manipulation in accordance with the identified processing instructions. The processor also provides the image information itself to the manipulator. The manipulator 8 generates a modified image 9 which is printed by a printer 10.

The photocopier and/or the image processing system 1 are operated by a user via a user interface 11. The user interface is linked to a controller 12 which controls the components of the photocopier, including the image-processing system 1. A set of computer instructions is stored in a ROM 13, which are executed by the controller 12 for performing photocopier operations. The ROM 13 also includes instructions for operating the image-processing system 1, which are executed by the processor 4. The instructions may be loaded into the ROM from a CD, or programmed via the internet.

In an alternative embodiment, the image-processing system 1 uses the photocopier controller 12 as its processor 4.

A display screen may also be provided on the user interface 11 in order to enable an interactive review of an image transformation resulting from a processing operation, prior to printing. The modified image is displayed on the interface 11 as it would be printed as a result of the user's instructions and options are presented to the user to enable confirmation or correction of the proposed image transformation to be performed so that resources are not wasted by printing documents which are not needed.

The image manipulator 8 performs processing of the input image using a technique appropriate to the particular processing instruction. As an example, rotation of a graphic is performed by multiplying the pixel array, extracted by the processor 4 as the region of interest, with a rotation matrix.

In another example, a redaction operation is carried out be carried out by setting all the pixels in the extracted region to black.

In another example, emphasis of text is carried out via a morphological thickening operator.

In another example, "highlighting" of text can be simulated by setting the background colour of a region of interest to yellow, for example.

Figure 10:
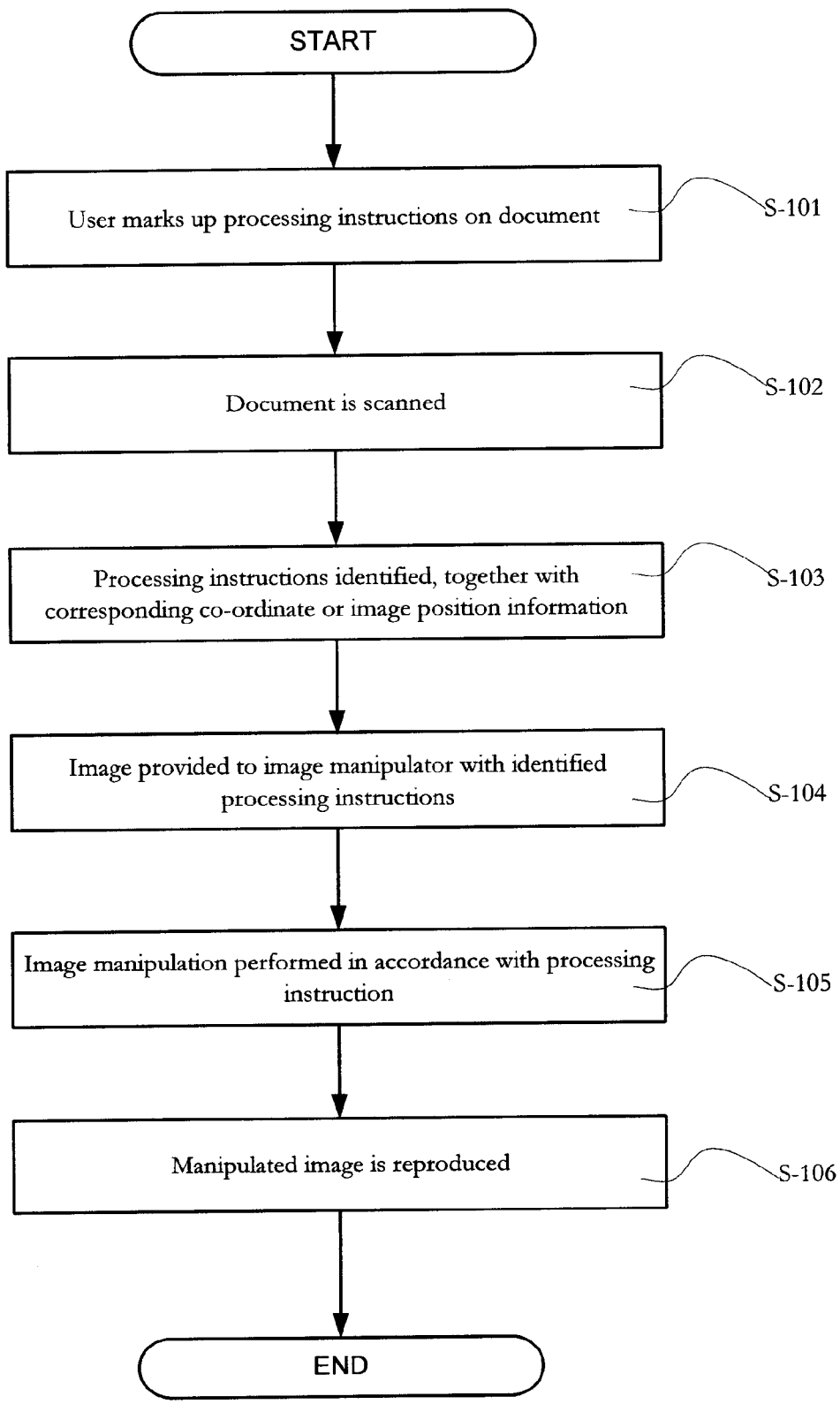
FIG. 10 is a flow chart showing the operation of an image-processing method according to an embodiment of the present invention.

FIG. 10 shows a flow chart of an image processing method performed using the photocopier shown in FIG. 9.

In step S-101, the user marks up one or more processing instructions on the document page 3 using a predetermined format, as demonstrated in FIGS. 3a and 7a, for example.

In step S-102, the user presses a copy command button on the user interface 11 of the photocopier in order to scan the marked up document 3.

In step S-103, the search module 2 identifies the processing instruction(s), and the portions of the document 3 to which they are to be applied, using the search algorithm such as that described with reference to FIG. 4.

In step S-104, the processor 4 provides the scanned image data and the identified processing instruction and region of interest to an image manipulator 8.

In step S-105, the image manipulator 8 performs the identified processing operation(s) on the region of interest of the scanned image to generate a modified image 9.

In step S-106, the printer 10 prints the modified image.

The markup scheme used in the embodiments described above can be modified to suit bilevel, greyscale as well as coloured original documents. The transformations applied can be modified to suit bilevel, greyscale as well as colour output, and can also be used to transform bi-level or greyscale documents into colour or vice-versa.

As mentioned above, the image processing system of the present invention can be used in a number of image reproduction devices. Another embodiment of the present invention uses the image processing system in a scanner for a computer. In this embodiment, the scanner is arranged to provide scanned image data to the search module via the receiver, and the output unit supplies image data and identified processing operation instructions to an image manipulator. The image manipulator converts the image to a form which is suitable for transmission to a computer as a digital image. The image may be in JPEG, TIFF, bitmap or other image formats which can be processed by a computer. The image can either be transferred to the computer on a user command, or can be stored in a memory in the scanner for a subsequent transfer.

In a modification to this embodiment, the image manipulator can be arranged to communicate with a facsimile modem in order to fax the modified document to a recipient. Alternatively, the image manipulator could be arranged to communicate with a network in order to send the modified image to another device as an E-mail attachment, or in order to route it to a separate printer.

In a further embodiment of the present invention, the image processing system forms part of a digital camera, which is capable of recording an image via an array of CCD sensors for example, for processing according to the present invention. The image processing system may also be included in a mobile phone. A device interface can be used which is similar to the user interface described in the photocopier embodiment above. Hard or soft keys can be used on the interface of a device in which the image-processing system is installed in order to implement actions where the same action needs to be applied to all selected regions.

The device in which the image-processing system is installed may be configured to leave the markup in the copy, or remove it, based on user preferences.

Embodiments of the present invention have the advantage that image processing operations can be carried out in a way which uses annotation styles with which most people are already familiar, and without the use of separate software applications or complicated masking techniques.

The invention claimed is:

1. An image-processing system comprising:
a processor;
a database for storing symbols, each symbol corresponding to an image-processing operation; and
a search module coupled to the processor and the database, for receiving an image and identifying a symbol in the image, wherein the search module includes an algorithm for:
applying a mask over the image; and
performing an exclusive NOR (XNOR) logic operation on the corresponding mask and the image to identify the symbol in the image;
wherein the processor is configured to determine the image-processing operation which corresponds to the identified symbol and to output information for processing the image according to the determined image-processing operation.

2. An image-processing system according to claim 1 in which the search module is arranged to determine a portion of the image to which the image-processing operation is to be applied.

3. An image-processing system according to claim 1 in which the search module is arranged to search for a symbol in a predetermined portion of the image.

4. A photocopier comprising:
a scanner for scanning a document to generate image data;
a search module for receiving the image data and identifying a symbol representing an image-processing operation in the image data from a plurality of symbols stored in a database, wherein the search module includes an algorithm for:
applying a mask over the image data; and
performing an exclusive NOR (XNOR) logic operation on the corresponding mask and the image data to identify the symbol representing the image-processing operation in the image data;
an image manipulator for manipulating the image in accordance with the identified image-processing operation to generate a modified image; and
a printer for printing the modified image.

5. A photocopier according to claim 4 in which the search module is arranged to determine a portion of the image data to which the identified image-processing operation applies.

6. A photocopier according to claim 5 comprising a user interface for displaying the modified image.

7. A method of processing an image, comprising:
receiving an image;
searching the image for a symbol, wherein the symbol is one of a plurality of symbols representing image-processing operations, stored in a database, wherein searching the image for a symbol comprises:
applying a mask over the image; and
performing an exclusive NOR (XNOR) logic operation on the corresponding mask and the image to identify the symbol in the image; and determining the image-processing operation which corresponds to the identified symbol; and outputting information for processing the image according to the determined image-processing operation.

8. A method according to claim 7 comprising determining an extent of the image to which the determined image-processing operation applies.

9. A method according to claim 8 comprising determining the extent of the image as the portion of the image contained within a frame marker.

10. A method according to claim 8 comprising determining the extent of the image as the portion of the image contained within the longitudinal extent of a marker in the margin of the image.

11. A method according to claim 7 comprising preparing a modified image by manipulating the received image in accordance with the determined image-processing operation.

12. A method according to claim 11 further comprising printing the modified image on a recording medium.

13. A method according to claim 11 further comprising storing the modified image.

14. A method according to claim 11 further comprising transmitting the modified image over a network.

15. A method according to claim 7 comprising searching for a symbol in a predetermined portion of an image.

16. A method according to claim 7 comprising searching for a predetermined number of symbols in an image.

17. A method according to claim 16 comprising searching for a predetermined subset of the symbols stored in the database.

18. A method according to claim 7 comprising determining each of the plurality of symbols from a set of samples of the symbol input by a user.

19. A method according to claim 7 comprising searching for a symbol of a predetermined colour.

20. A method according to claim 7 comprising searching for a symbol having a predetermined frame.

21. A method according to claim 7, wherein searching the image for a symbol comprises:

applying a mask of pixels, corresponding to the two-dimensional pixel array, over at least the portion of the image;

performing an exclusive NOR (XNOR) logic operation on corresponding mask of pixels and image pixels in the two-dimensional array, wherein the result of the XNOR operation is a mask sized array of bits, and wherein each of the mask sized array of bits is high when the mask pixel matches corresponding image pixel;

summing the mask sized array of bits; and comparing the summed bits to a predetermined threshold value to identify the symbol in the image.

22. An image-processing system according to claim 1, wherein the search module receives the image in the form of a two-dimensional pixel array, and wherein the search module includes the algorithm for:

applying a mask of pixels, corresponding to the two-dimensional pixel array, over at least the portion of the image;

performing an exclusive NOR (XNOR) logic operation on corresponding mask of pixels and image pixels in the two-dimensional array, wherein the result of the XNOR operation is a mask sized array of bits, and wherein each of the mask sized array of bits is high when the mask pixel matches corresponding image pixel;

summing the mask sized array of bits; and comparing the summed bits to a predetermined threshold value to identify the symbol in the image.

\* \* \* \* \*